(12) United States Patent
Durán Alcaide et al.

(10) Patent No.: US 12,549,638 B2
(45) Date of Patent: Feb. 10, 2026

(54) TRACE RECEIVER AND MME RECEIVER SERVICE FOR RAN PARSER

(71) Applicant: TC France S.A.S., Saint-Jacques de la Lande (FR)

(72) Inventors: Angel Durán Alcaide, Pontevedra (ES); Juan José Rubio Esteban, València (ES); Maria Amparo Navarro Peris, València (ES); Rubén Rosell Saborit, Castellón (ES)

(73) Assignee: TC France S.A.S., Saint-Jacques-de-la-Lande (FR)

( * ) Notice: Subject to any disclaimer, the term of this patent is extended or adjusted under 35 U.S.C. 154(b) by 137 days.

(21) Appl. No.: 18/459,820

(22) Filed: Sep. 1, 2023

(65) Prior Publication Data

US 2024/0080368 A1    Mar. 7, 2024

Related U.S. Application Data

(60) Provisional application No. 63/441,640, filed on Jan. 27, 2023, provisional application No. 63/404,433, filed on Sep. 7, 2022.

(51) Int. Cl.
*H04L 67/147* (2022.01)
*H04L 69/00* (2022.01)

(52) U.S. Cl.
CPC ............ *H04L 67/147* (2013.01); *H04L 69/03* (2013.01)

(58) Field of Classification Search
None
See application file for complete search history.

(56) References Cited

U.S. PATENT DOCUMENTS

| | | |
|---|---|---|
| 7,830,812 B2 | 11/2010 | Atkins et al. |
| 8,902,754 B2 | 12/2014 | Ali et al. |
| 9,241,241 B2 | 1/2016 | Amirijoo et al. |

(Continued)

FOREIGN PATENT DOCUMENTS

| | | |
|---|---|---|
| EP | 3668014 A1 | 6/2020 |
| WO | 2016075637 A1 | 5/2016 |

OTHER PUBLICATIONS

Borralho et al., Developing a LTE Localization Framework using Real Network Data towards RAN Optimization through Context Knowledge. IEEE Xplore [online], [retrieved on Sep. 18, 2022]. Retrieved from the Internet <URL: https://ieeexplore.ieee.org/document/9309483> <DOI: 10.1109/WPMC50192.2020.9309483>.

(Continued)

*Primary Examiner* — Mohamed Ibrahim
(74) *Attorney, Agent, or Firm* — Baratta Law PLLC; Lawrence A. Baratta, Jr.

(57) ABSTRACT

A method includes receiving a data stream from a mobile network having one or more vendor's equipment and one or more wireless technologies; decoding a message from the data stream based on what port the message was received on, wherein the port is used to automatically detect how the decoding performs based on one or more of vendor's equipment and wireless technology; converting the message to a common output format based on the decoding, wherein the common output format is a same format for the one or more vendor's equipment and the one or more wireless technologies; and providing the message in the common output format for subsequent processing.

20 Claims, 8 Drawing Sheets

(56) References Cited

U.S. PATENT DOCUMENTS

| | | |
|---|---|---|
| 9,277,431 B1 | 3/2016 | Podolsky |
| 10,652,506 B2 * | 5/2020 | Abkairov ......... H04N 21/44245 |
| 10,674,371 B2 | 6/2020 | Hopcraft |
| 11,206,589 B2 | 12/2021 | Chen et al. |
| 2006/0089838 A1 * | 4/2006 | Gentric ............ H04N 21/23439 |
| | | 375/E7.023 |
| 2006/0114136 A1 * | 6/2006 | Chu ...................... H04N 19/12 |
| | | 375/E7.199 |
| 2006/0274703 A1 | 12/2006 | Connelly |
| 2007/0004396 A1 | 1/2007 | Connelly |
| 2009/0177789 A1 | 7/2009 | Choudhury |
| 2017/0085328 A1 * | 3/2017 | Dickemann, Jr. ...... H04H 20/02 |
| 2020/0021411 A1 * | 1/2020 | Ren ..................... H04J 11/0036 |
| 2021/0329479 A1 | 10/2021 | Al-Dulaimi et al. |
| 2021/0352484 A1 | 11/2021 | Pandit et al. |
| 2022/0239515 A1 * | 7/2022 | Schmitz ................ H04L 65/403 |

OTHER PUBLICATIONS

Barmpounakis et al., Data Analytics for 5G Networks: A Complete Framework for Network Access Selection and Traffic Steering ,International Journal on Advances in Telecommunications, issn 1942-260,1vol. 11, No. 3 & 4, year 2018, pp. 101 to 143, [online], [retrieved on Apr. 19, 2019]. Retrieved from the Internet <URL: http://www.iariajournals.org/telecommunications/>.

* cited by examiner

| | INPUT 3GPP standard message from a 4G vendor | OUTPUT | | |
|---|---|---|---|---|
| | Field | Field | Comments | Mappings to a predetermined list of values |
| File Header | Data Version | version | 1.0 | |
| | TZOffset | time_zone_correction | NOT IN USE | |
| | DSTOffset | timestamp_dst_cor | NOT IN USE | |
| | Spare | | | |
| Message | Event ID | message_type | | list of message types |
| | Event Length | | | |
| | eNodeB ID | enb_id | | |
| | Cell ID | cell_id | | |
| | Call ID | fragment_id_2 | | |
| | Date Time | timestamp_utc_ms | | |
| | Extend Head Length | | | |
| | Item Type | | | |
| | Reserved | | | |
| | CRNTI | c_rnti | | |
| | Message Direction | message_direction | | undefined = 0, sent = 1, received = 2 |
| | Message Length | | | |
| | Message Content | message_content | remove first byte | |
| | | technology | lte | |
| | | vendor | vendor | |
| | | mcc | from system configuration | |
| | | mnc | from system configuration | |
| | | fragment_id_1 | eNodeB ID + Cell ID + CRNTI | |
| | | core_ue_id | LACK OF INFORMATION IN THIS VENDOR 4G | |
| | | ran_ue_id | LACK OF INFORMATION IN THIS VENDOR 4G | |
| | | gummei | LACK OF INFORMATION IN THIS VENDOR 4G | |
| | | gnodeb_id_length | from system configuration | |

*FIG. 5*

| | INPUT 3GPP standard message from a 4G vendor | OUTPUT | | |
|---|---|---|---|---|
| | Field | Field | Comments | Mappings to a predetermined list of values |
| File Header | Data Version | version | 1.0 | |
| | TZOffset | time_zone_correction | NOT IN USE | |
| | DSTOffset | timestamp_dst_cor | NOT IN USE | |
| | Spare | | | |
| Message | Event ID | message_type | | list of message types |
| | Event Length | | | |
| | eNodeB ID | enb_id | | |
| | Cell ID | cell_id | | |
| | Call ID | fragment_id_2 | | |
| | Date Time | timestamp_utc_ms | | |
| | Extend Head Length | | | |
| | Item Type | | | |
| | Reserved | | | |
| | CRNTI | c_rnti | | |
| | Message Direction | message_direction | | undefined = 0, sent = 1, received = 2 |
| | Message Length | | | |
| | Message Content | message_content | remove first byte | |
| | | technology | lte | |
| | | vendor | vendor | |
| | | mcc | from system configuration | |
| | | mnc | from system configuration | |
| | | fragment_id_1 | eNodeB ID + Cell ID + CRNTI | |
| | | core_ue_id | LACK OF INFORMATION IN THIS VENDOR 4G | |
| | | ran_ue_id | LACK OF INFORMATION IN THIS VENDOR 4G | |
| | | gummei | LACK OF INFORMATION IN THIS VENDOR 4G | |
| | | gnodeb_id_length | from system configuration | |

*FIG. 6*

TRACE RECEIVER AND MME RECEIVER SERVICE FOR RAN PARSER

CROSS-REFERENCE TO RELATED APPLICATION(S)

The present disclosure claims priority to U.S. Provisional Patent Application No. 63/441,640, filed Jan. 27, 2023, and U.S. Provisional Patent Application No. 63/404,433, filed Sep. 7, 2022, the contents of each are incorporated by reference in their entirety.

FIELD OF THE DISCLOSURE

The present disclosure relates generally to networking and computing. More particularly, the present disclosure relates to systems and methods for a trace receiver and a Mobile Management Entity (MME) receiver service for a Radio Access Network (RAN) parser.

BACKGROUND OF THE DISCLOSURE

In a telecommunications network, there are solutions for planning, troubleshooting and optimizing mobile networks using dynamic, geo-located devices, and subscriber data. A RAN Data Processing System (also referred to herein as a Parser, a RAN parser, and a parsing agent) is a scalable software adapter which collects and processes 2G, 3G, 4G and 5G 3rd Generation Partnership Project (3GPP) and vendor-specific RAN call events to generate call records and, optionally geolocated call records and real time location insights. The main output of RAN parser is a RAN user call data record (CDR) based on the messages provided by the network. This requires a correlation between different sources and messages found in the customer's information. And the aim is to provide the CDR as soon as the call in the network has finished.

Parsers can receive information provided by the customer's network elements via files (logs) or Transmission Control Protocol (TCP) streams. Parsers should be able to understand, process and provide outputs independently of the vendor/technology input specificities, that is, should be vendor/technology agnostic. RAN parsers require Call Traces (CTs) as inputs. CTs are generated by Network Elements (NEs) from the client's mobile network and have a vendor proprietary format depending on various factors. There is a need for RAN parsers that are multi-vendor and multi-technology, meaning they must support (1) as many as possible input format variations based on the various factors, and (2) providing outputs with a common structure for all of them (agnostic output).

BRIEF SUMMARY OF THE DISCLOSURE

The present disclosure relates to systems and methods for a trace receiver and a Mobile Management Entity (MME) receiver service for a Radio Access Network (RAN) parser. In an embodiment, a method includes receiving a data stream from a mobile network having one or more vendor's equipment and one or more wireless technologies; decoding a message from the data stream based on what port the message was received on, wherein the port is used to automatically detect how the decoding performs based on one or more of vendor's equipment and wireless technology; converting the message to a common output format based on the decoding, wherein the common output format is a same format for the one or more vendor's equipment and the one or more wireless technologies; and providing the message in the common output format for subsequent processing.

In various embodiments, the present disclosure can include a method having steps, a processing device configured to implement the steps, and a non-transitory computer-readable medium storing instructions for programming one or more processors to implement the steps. The steps include receiving a data stream from a mobile network having one or more vendor's equipment and one or more wireless technologies; decoding a message from the data stream based on what port the message was received on, wherein the port is used to automatically detect how the decoding performs based on one or more of vendor's equipment and wireless technology; converting the message to a common output format based on the decoding, wherein the common output format is a same format for the one or more vendor's equipment and the one or more wireless technologies; and providing the message in the common output format for subsequent processing.

The steps can further include performing the subsequent processing in a vendor/technology agnostic manner. The receiving can be performed at an edge location in the mobile network. The steps can further include load balancing after the receiving prior to the decoding, to provide messages from the data stream to one a plurality of services. The load balancing can be performed automatically in a round-robin fashion without analyzing the messages. The steps can further include determining messages are part of a same call based on a computed identifier. The computed identifier can be based on a plurality of technology, Mobile Country Code, Mobile Network Code, base station identifier, a first fragment, and a second fragment, wherein each of the first fragment and second fragment are vendor specific.

The steps can further include performing data enrichment to add information not present in the message. The enrichment can include a base station identifier inferred from information in the message. The enrichment can include a message direction determined based on a type of the message, vendor specifications, and standard message specifications. The performing data enrichment can include one or more of calculating to change units to the same format, transforming a date format to the same format, combining several inputs into one output, and splitting one input into several outputs. The decoding and the converting can be performed by one of a Trace Receiver Service and a Mobile Management Entity (MME) Receiver Service. The Trace Receiver Service can operate on main Call Traces and the MME Receiver Service can operate on additional Call Traces containing user identity information of users performing calls.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is an example of combination of several input fields to generate an output (fragment_id_1).

FIG. 6 is an example of one input field (Cell Id) involved in the generation of several outputs.

DETAILED DESCRIPTION OF THE DISCLOSURE

Figure 1:
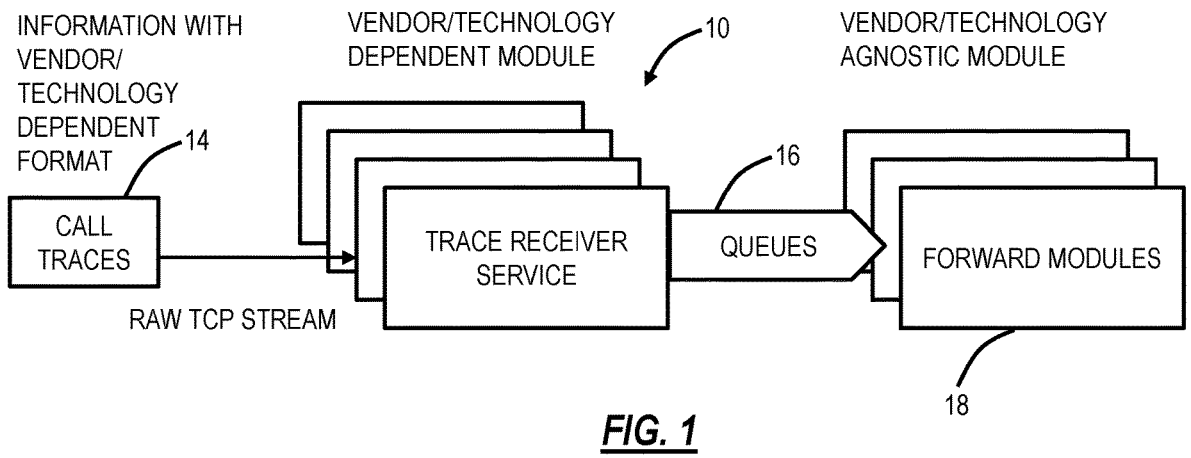
FIG. 1 is a block diagram of an architecture of a Trace Receiver Service.

Again, the present disclosure relates to systems and methods for a trace receiver and a Mobile Management Entity (MME) receiver service for a Radio Access Network (RAN) parser. The purpose of the current Parsers (non-cloud native) is to regenerate a RAN user call based on the messages provided by the network. There is a correlation between different sources and messages, and this information is targeted as soon as the call in the network has finished. Apart from the "call details" output (CDR), the parser is able to provide other processed outputs, such as the geolocation (GDR) of the user along the call in Near Real Time (NRT) or specific Key Performance Indicators (KPIs) that allow optimization algorithms and recommendations to the network operator about which should be changed in the RAN network configuration to improve its quality. Parsers receive information provided by the customer network elements by files or by TCP streams (natively only in the Cloud Parser architecture). The supported formats depend on the vendor and technology; therefore, the Parsers should be able to understand, process and provide the corresponding outputs independently of the vendor/technology specificities.

The present disclosure includes a Cloud Native Parser that reproduces the behavior of the current Parsers via a new architecture that requires changes in terms of how the information is processed how it is distributed along the different elements, how it is generated and how it is sent out of the system. The Cloud Native Parser aims to replace the legacy architecture making it more flexible and able to be deployed in several pieces along different locations (edge, central, etc. in a customer network in front of the monolithic version where only the central site deployment was allowed.

RAN Parser

RAN parsers require Call Traces (CTs) as inputs. CTs are generated by Network Elements (NEs) from the client's mobile network and have a vendor proprietary format depending on the vendor itself: e.g., Huawei, Nokia, Ericsson, Samsung, ZTE, etc.

the technology of the mobile network: 2G, 3G, 4G, 5G, etc.

the trace format: e.g., there are Huawei 4G traces in format "TRC" and Huawei 4G traces in format STDSIG, and not only the format changes but also the content (there is information present in one but not in the other and vice versa)

the trace release: there can be internal changes between vendor release X.1 and vendor release X.2 of a certain trace format (changes in existent information, addition of new information, deprecation of existent information)

The present disclosure includes a RAN parser that is multi-vendor and multi-technology, meaning it supports (1) as many as possible input format variations described above, and (2) provides outputs with a common structure for all of them (agnostic output). In order to address a RAN parser that is multi-vendor, multi-technology, the present disclosure includes an approach to convert the input into a vendor/technology agnostic format as soon as possible in the system pipeline, limiting the impact of input variation evolutions to a single module, simplifying the processing after the ingestion and decreasing the computation power.

Figure 2:
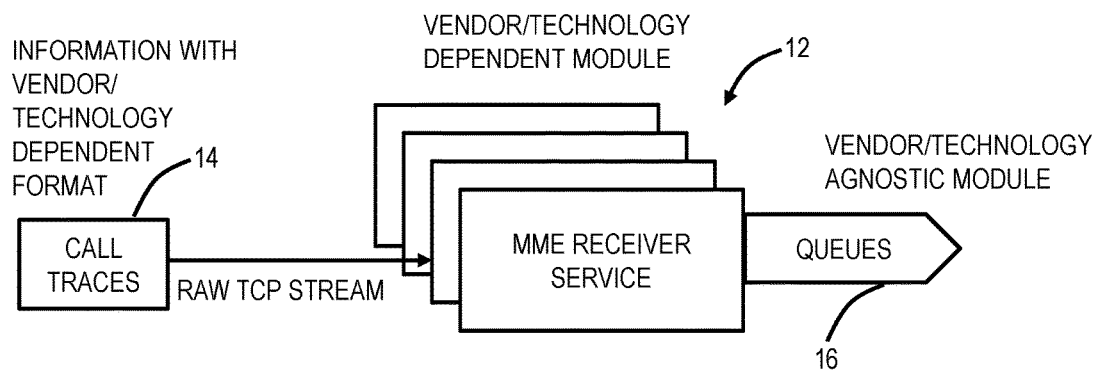
FIG. 2 is a block diagram of an architecture of a MME Receiver Service.

There are two types of Call Traces judging by the nature of the information they contain, and, as such, the present disclosure includes two modules for the input conversion. FIG. 1 is a block diagram of a Trace Receiver Service 10, and FIG. 2 is a block diagram of an MME Receiver Service 12. The Trace Receiver Service 10 ingests main Call Traces, containing information of the calls performed by users. The MME Receiver Service 12 ingests additional Call Traces containing user identity information of the users performing the calls. These traces could be present or not in the system. If not present, the Parser still provides outputs but without details of the user or the mobile device being used during the call.

In particular, the Trace Receiver Service 10 and the MME Receiver Service 12 both have the following characteristics:

They both read vendor/technology dependent information as input and generate a vendor/technology agnostic output, so the subsequent modules in the system can be vendor/technology agnostic too, They both can be deployed at the edge instead of in a centralized, monolithic location, They avoid discovering which type of information (vendor, technology) is received based on stream content, it is based on information automatically received from the OS (port in which the stream is received), avoiding any kind of processing for taking this decision, and Load balancing is automatically performed at input, based on the previous parameter and the connection itself in a round-robin fashion without any analysis of the stream content.

Trace Receiver Service

Referring to FIG. 1, Call Traces 14 are provided by network elements in a customer's network (not shown) and are logs of the calls performed by the users with a format dependent on the technology (2G, 3G, 4G, 5G) and on the vendor. These Call Traces 14 can be via a raw TCP stream provided to the Trace Receiver 10 which is vendor/technology dependent itself due to having to adapt its processing to each of the vendor/technology format supported as input, but its output is vendor/technology agnostic, via queues 16. Of note, the Trace Receiver Service 10 can be part of a Parser.

In general, the Trace Receiver Service 10 is configured to extract the same information from all vendors, but it each vendor may have a different format which the Trace Receiver 10 is configured to adapt. Also, some information is only present in certain vendors. For example, in an embodiment, the vendors can include Huawei 5G, Huawei 4G, Ericsson 4G, Nokia 4G, and the like.

In an embodiment, the Trace Receiver Service 10 avoids discovering which type of information (vendor, technology) is received from the raw TCP stream. Instead, it can be based on information automatically received from the Operating System (OS), e.g., based on a port in which the stream is received, avoiding any kind of processing for taking this decision. That is, a stream received on port X is vendor Y, on Port W is vendor Z, etc.

There can be multiple Trace Receiver Service 10 for load balancing being automatically performed at input, based on the previous parameter and the connection itself, such as in a round-robin fashion without any analysis of the stream content. Service extracts from the stream data each message, decodes it, gets the required fields, generates a structure with desired information and sends it to the output queue. Note, in an embodiment, the system can be implemented in Apache Kafka. In the Apache Kafka Queueing system, messages are saved in a queue fashion. This allows messages in the queue to be ingested by one or more consumers, but one consumer can only consume each message at a time. The Queue topic in the Apache Kafka Queue will contain the messages to be processed.

The output format provided by the Trace Receiver Service 10 allows all the elements after it, e.g., in a microservices pipeline, i.e., forward modules 18, to stay independent of the vendor/technology, summarizing the diverse input message information from the different vendors and technologies in a common output internal format.

This independency is done as close as possible to the source, that is, the element that is accessing the customer network, allowing the simplification of all the processing that is performed after the ingestion and decreasing the computation power as well.

The Trace Receiver Service 10 is configured to perform calculations/combine/demultiplex/enrichment of different fields of different vendors and technologies on top of the same field in the message output. Any computation that is needed in further services, i.e., the forward modules 18, is only based on this non-vendor specific information.

In an embodiment, the following table includes an example output format of the Trace Receiver Service 10. Those skilled in the art will appreciate this is merely illustrative and practical embodiments may include other vendors, technologies, new vendors, technology, etc.

TABLE 1

Output of Trace Receiver Service

| Field | Type | Description |
|---|---|---|
| timestamp_utc_ms | int64 | Timestamp of the message in milliseconds |
| time_zone_correction | int32 | Time zone correction |
| timestamp_dst_cor | int32 | Day Light Save Time Correction |
| technology | int32 | Technology |
| vendor | int32 | Vendor |
| version | int32 | Version |
| mcc | string | Mobile Country Code of the subscriber network (3 digits) |
| mnc | string | Mobile Network Code of the subscriber network (2 o 3 digits) |
| fragment_id_1 | int64 | First Identifier of the Unique Session Id for the UE |
| fragment_id_2 | int64 | Second Identifier of the Unique Session Id for the UE |
| enb_id | int64 | eNodeB Id or gNodeB Id depending on technology |
| cell_id | int32 | Cell Id |
| core_ue_id | int64 | mme_ue_slap_id or amf_ue_ngap_id depending on the technology. Uniquely identifies the User Equipment (UE) association over the S1 interface within the MME or NG interface within the Access and Mobility Management Function (AMF) |
| ran_ue_id | int64 | enb_ue_slap_id or ran_ue_ngap_id depending on the technology. Uniquely identifies the UE association over the S1 interface within an evolved NodeB eNB or NG interface within a Next generation NodeB (gNB) |
| gummei | int64 | gummei or guami depending on the technology. Unique identifier of a MME or an AMF |
| c_rnti | int32 | Cell- Radio Network Temporary Identifier (RNTI) (C-RNTI) Identifier |
| message_type | int32 | Example enumerated to identify the same message from different vendors |
| message_direction | int32 | Message direction: sent, received |
| message_content | bytes | asn.1 content for 3GPP messages, raw data for proprietary messages |
| gnodeb_id_length | int32 | Number of bits to encode gNodeB id |

In an embodiment, the combination of technology+mcc+mnc+enb_id+fragment_id_1+fragment_id_2 can be used to create an identifier that determines which messages are part of the same call.

fragment-id_1 and fragment_id_2 are calculated fields based on vendor/technology dependent information contained in the Call Trace 14. They allow services in the pipeline to continue processing information without being vendor aware. The following is an example of calculation for some of the vendors in 4G and 5G. Again, those skilled in the art will appreciate this is merely illustrative and practical embodiments may include other vendors, technologies, new vendors, technology, etc.

TABLE 2

Example of calculation of Fragment Id 1 & Fragment Id 2 for some vendors

| | Fragment Id 1 | Fragment Id 2 |
|---|---|---|
| Ericsson LTE | Global Cell Id - Radio Access Controller (RAC) UE Ref | Trace Recording Session Reference |
| Huawei LTE | eNodeB Id - Cell Id - CRNTI | Call Id |
| Nokia LTE | eNodeB Id - Cell Id | Evolved-UMTS Terrestrial Radio Access Network (EUTRAN) Trace ID |

TABLE 2-continued

Example of calculation of Fragment Id
1 & Fragment Id 2 for some vendors

| | Fragment Id 1 | Fragment Id 2 |
|---|---|---|
| Samsung LTE | eNodeB Id - Cell Id | Public Land Mobile Network (PLMN) Id - Trace Id - Trace Recording Session Reference |
| Huawei New Radio (NR) | gNodeB Id - Cell Id | Call Id |
| Samsung NR | gNodeB Id - Cell Id | PLMN Id - Trace Id - Trace Recording Session Reference |

Trace Receiver Service Example

Figure 3:
FIGS. 3 and 4 are tables of an example of inputs and outputs to/from the Trace Receiver Service 10 with FIG. 3 being from a 4G vendor input 3GPP standard messages and FIG. 4 being from a 4G vendor input vendor proprietary messages.
Figure 4:

FIGS. 3 and 4 are tables of an example of inputs 20 and outputs 22 to/from the Trace Receiver Service 10 with FIG. 3 being from a 4G vendor input 3GPP standard messages and FIG. 4 being from a 4G input vendor proprietary messages. Two kinds of messages can be found at the input given any vendor/technology: 3GPP standard messages and vendor proprietary ones. They have a slightly different structure and content so the calculation of the output is slightly different too, as seen in FIGS. 3 and 4. Since output information is still provided per message at the output, it can be filtered by only certain messages of interest towards the next pipeline steps.

Also, the Parser includes an innovative approach for doing the distribution of the input information: it is able to generate the links between the different messages received from the network with a methodology that allows keeping the related messages together with minimum hardware resources inside the same computing unit, namely using the identifier described above.

The distribution aims to be based only on data present in the information sent by the network elements inside the data flows, including:
  Technology
  Vendor
  MCC (not available from network, obtained from Cloud Native Parser configuration)
  MNC (not available from network, obtained from Cloud Native Parser configuration)
  NodeId Data Correlation For transforming the inputs 20 into outputs 22, the Trace Receiver Service 10 needs to:
  Calculate:
    change units: e.g., nanoseconds into milliseconds
    transform format: e.g., from human time "yyyy, mm, dd, hh:mm:ss:msec" to UTC (Unix Time)
  Multiplex/Combine: several inputs into one output: e.g., "fragment_id_1", see FIG. 5 which is an example of combination of several input fields to generate an output (fragment_id_1).
  Demultiplex: one input into several outputs: e.g., "cell_id". See FIG. 6 which is an example of one input field (Cell Id) involved in the generation of several outputs.
  Enrich: data when not present in the input message inferring it by other means: e.g., "eNB_Id (node Id)".
    Messages from a certain node will always come from the same combination of [Internet Protocol (IP)/Port/TCP_stream_Id]. Therefore, even if our current message does not contain the "eNB_Id" itself, we can look for other messages with the same [IP/Port/TCP_stream_Id] and retrieve from them the "eNB_Id".
    adding it from technical specifications: e.g., "message_direction". We rely on vendor proprietary specification and on 3GPP standard specifications.

MME Receiver Service

Referring to FIG. 2, the MME Receiver Service 12 collects vendor/technology dependent information, from Call Traces 14, from the customer's network about the identity of the users. Each supported vendor has its own file format, so a different decoder for each one is needed, as in the case of Call Traces 14. This service is fed by streams of data sent directly from the MME (a Network Element) or by a file-to-stream-converter.

The MME Receiver Service 12 receives streaming data and depending on the port decides which type of decoder must use. The MME Receiver Service 12 extracts from the stream data each message, decodes it, gets the required fields, generates a structure with desired information and sends it to the output queue 16.

No sensitive data is encrypted at this point. Time corrections are retrieved from system configuration since they are not present in the input. Basically, the same information is extracted from all vendors, it needs to be transformed and gathered from different formats in each of them. Example supported inputs: binary files from Ericsson, Huawei, EXFO probes and custom data files on Comma Separated Value (CSV) format (plain text).

Figure 7:
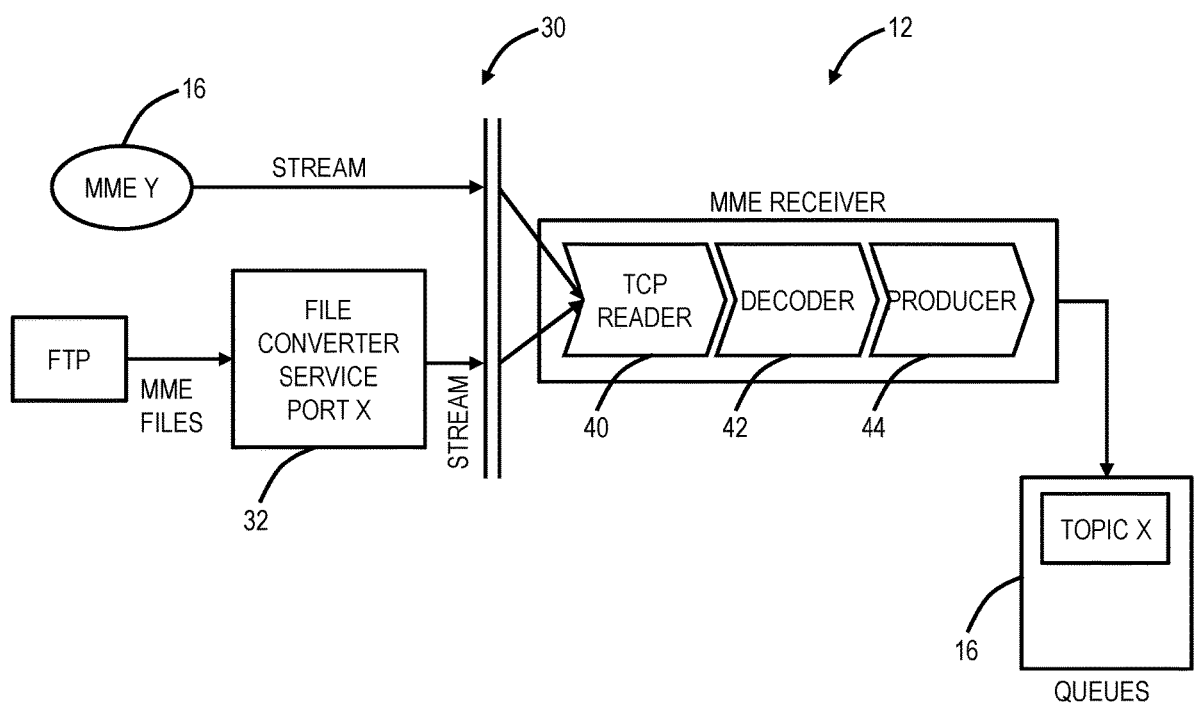
FIG. 7 is a diagram of example details of the MME Receiver Service.

FIG. 7 is a diagram of example details of the MME Receiver Service 12. The MME Receiver Service 12 is configured to receive streaming data 30, such as from a network element (MME Y 32) or a file-to-stream-converter 32. The MME Receiver Service 12 includes a TCP reader 40, a decoder 42, and a producer 44. The TCP reader 40 is configured to detect the port and type based thereon. The decoder 42 is configured to process and filter the input and only a set of fields in a common output internal format is sent to the next module in the pipeline, via the producer 44.

Since specific processing is required per vendor/technology within this element, the MME Receiver Service 12 is considered as vendor/technology dependent itself, but not its output, described as follows. The MME Receiver Service 12 output can contain three mandatory fields:
  t Timestamp
  z Timezone
  t Day Light Saving Time Correction
Detail of the output format (Again, this list is merely for illustrative purposes and this list can be increased based on new vendors/technologies):

TABLE 3

Output format of MME Receiver Service

| Field | Type | Description |
|---|---|---|
| timestamp_utc_ms | int64 | Timestamp of the message in milliseconds (UNIX format) |
| time_zone_correction | int32 | Time zone correction |
| timestamp_dst_cor | int32 | Day Light Save Time Correction |
| mme_ue_s1ap_id | int64 | mme_ue_s1ap_id or amf_ue_ngap_id depending on the technology. Uniquely identifies the UE association over the S1 interface within the MME or NG interface within the AMF |

TABLE 3-continued

Output format of MME Receiver Service

| Field | Type | Description |
| --- | --- | --- |
| enb_ue_s1ap_id | int64 | enb_ue_slap_id or ran_ue_ngap_id depending on the technology. Uniquely identifies the UE association over the S1 interface within a eNB or NG interface within an gNB |
| imsi | int64 | International Mobile Subscriber Identity |
| imeisv | int64 | International Mobile Equipment Identity |

Example of mapping of 4G vendor CTUM fields (input) to output structure:

TABLE 4

Mapping of a CTUM vendor input to MME Receiver output structure

| CTUM Register | mme_record.avsc |
| --- | --- |
| Year | timestamp_utc |
| Month | |
| Day | |
| Hour | |
| Minute | |
| Second | |
| Millisecond | |
| | time_zone_correction |
| | timestamp_dst_cor |
| Macro eNodeB Id | |
| Home eNodeB Id | |
| IMSI | imsi |
| IMEISV | imeisv |
| GUMMEI | |
| MME S1 AP ID | mme_ue_s1ap_id |
| ENB S1 AP ID | enb_ue_s1ap_id |

The output is balanced automatically using default round robin method provided by the message queue, since there is no relationship between the different messages generated.

Data Correlation

Figure 8:
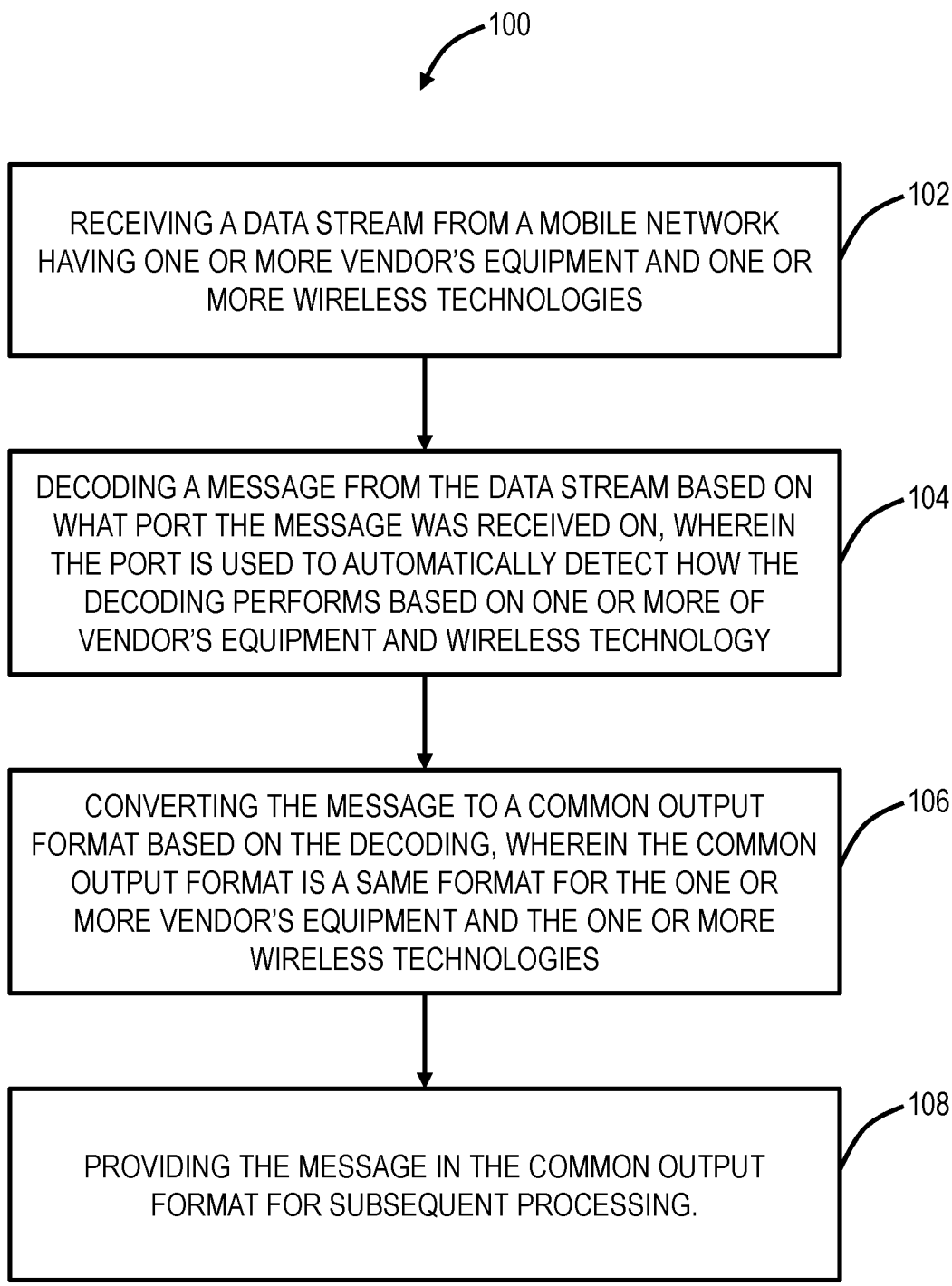
FIG. 8 is a flowchart of a process for receiving Call Trace data and generate a vendor/technology agnostic output.

Notice that, for transforming the inputs into outputs, the MME Receiver Service 12 needs to:

Calculate:
  change units: e.g., nanoseconds into milliseconds
  transform formats: e.g., from one input timestamp coming in human time format "yyyy, mm, dd, hh:mm:ss:msec" into one output timestamp in UTC (Unix Time) format
Multiplex/Combine: several inputs into one output: e.g., x time input fields (year, month, day, hour, second, millisecond, nanosecond) into one timestamp_utc Process FIG. 8 is a flowchart of a process 100 for receiving Call Trace data and generate a vendor/technology agnostic output. The process 100 contemplates implementation as a method having steps, via a processing device configured to implement the steps, via a cloud service configured to implement the steps, and/or as non-transitory computer-readable medium with instructions that, when executed, cause one or more processors to implement the steps.

The process 100 includes receiving a data stream from a mobile network having one or more vendor's equipment and one or more wireless technologies (step 102); decoding a message from the data stream based on what port the message was received on, wherein the port is used to automatically detect how the decoding performs based on one or more of vendor's equipment and wireless technology (step 104); converting the message to a common output format based on the decoding, wherein the common output format is a same format for the one or more vendor's equipment and the one or more wireless technologies (step 106); and providing the message in the common output format for subsequent processing (step 108).

The process 100 can further include performing the subsequent processing in a vendor/technology agnostic manner. The receiving can be performed at an edge location in the mobile network. The process 100 can further include load balancing after the receiving prior to the decoding, to provide messages from the data stream to one a plurality of services. The load balancing can be performed automatically in a round-robin fashion without analyzing the messages.

The process 100 can further include determining messages are part of a same call based on a computed identifier. The computed identifier can be based on a plurality of technology, Mobile Country Code, Mobile Network Code, base station identifier, a first fragment, and a second fragment, wherein each of the first fragment and second fragment are vendor specific.

The process 100 can further include performing data enrichment to add information not present in the message. The enrichment can include a base station identifier inferred from information in the message. The enrichment can include a message direction determined based on a type of the message, vendor specifications, and standard message specifications.

The decoding and the converting can include one or more of: calculating to change units to the same format, transforming a date format to the same format, combining several inputs into one output, splitting one input into several outputs, and enriching data not present in the message.

The decoding and the converting can be performed by one of a Trace Receiver Service and a Mobile Management Entity (MME) Receiver Service.

The Trace Receiver Service can operate on main Call Traces and the MME Receiver Service can operate on additional Call Traces containing user identity information of users performing calls.

Processing System

Figure 9:
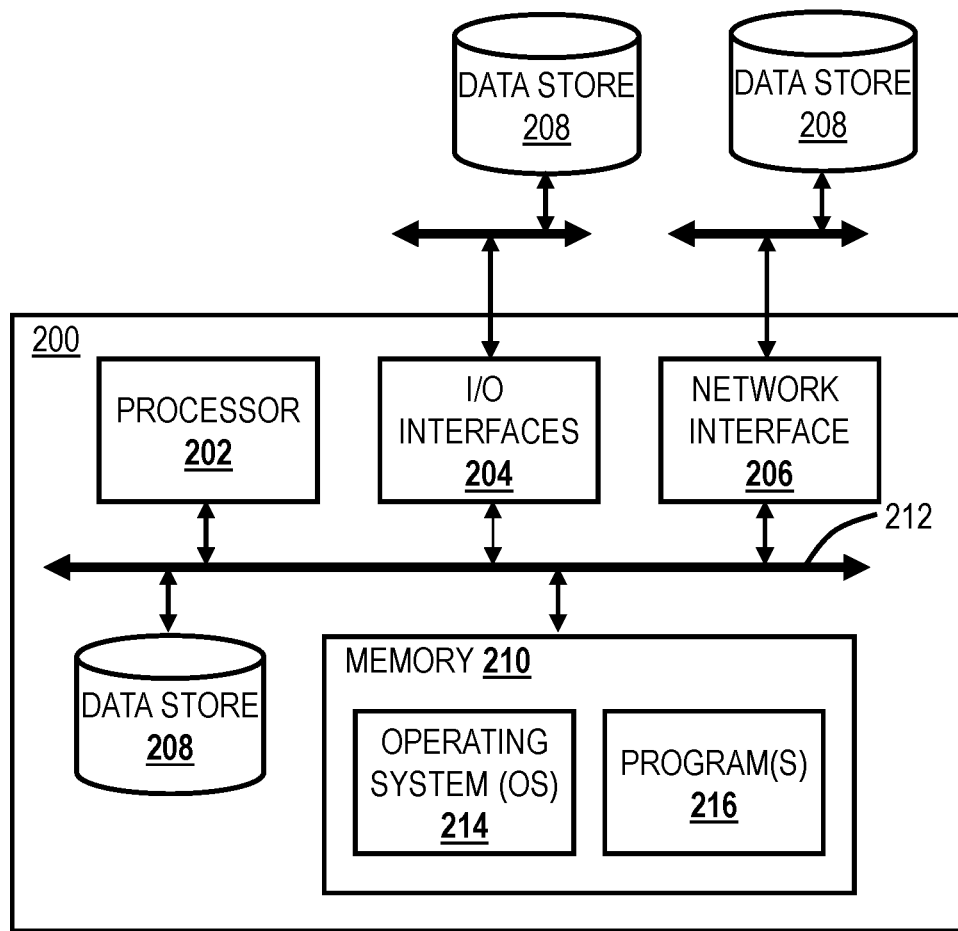
FIG. 9 is a block diagram of a processing system, which may be used to implement the process of FIG. 8.

FIG. 9 is a block diagram of a processing system 200, which may be used to implement the process 100. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 9 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an embodiment, one or more processing devices 200 can be configured in a cluster and/or in a cloud system, for implementing the process 100. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   receiving a Transmission Control Protocol (TCP) data stream comprising Call Traces in vendor-proprietary formats from a mobile network having one or more vendor's equipment and one or more wireless technologies;
   decoding a message from the data stream via one of a plurality of vendor- and technology-specific decoder types based on what network port the message was received on, wherein the port is used without analyzing content of the data stream and based on an operating-system determination to automatically decide which type of decoder must be used and detect how the decoding performs based on one or more of vendor's equipment and wireless technology;
   converting the message to a vendor/technology-agnostic common output format based on the decoding, wherein the common output format is a same format for the one or more vendor's equipment and the one or more wireless technologies; and
   providing the message in the common output format for subsequent processing.

2. The method of claim 1, wherein the steps further include:
   load balancing messages within the data stream after the receiving and prior to the decoding, to provide messages from the data stream to one of a plurality of services.

3. The method of claim 2, wherein the load balancing is performed automatically in a round-robin fashion without analyzing the messages.

4. The method of claim 1, wherein the steps further include:
   determining messages are part of a same call based on a computed identifier.

5. The method of claim 4, wherein the computed identifier is based on a plurality of technology, Mobile Country Code, Mobile Network Code, base station identifier, a first fragment, and a second fragment, wherein each of the first fragment and second fragment are vendor specific.

6. The method of claim 1, wherein the steps further include:
   performing data enrichment to add information not present in the message.

7. The method of claim 6, wherein the enrichment includes inferring a node identifier from information in the message and other messages having a same combination of Internet Protocol (IP), port, and Transmission Control Protocol (TCP) stream identifier.

8. The method of claim 6, wherein the enrichment includes a message direction determined based on a type of the message, vendor specifications, and standard message specifications.

9. The method of claim 6, wherein the performing data enrichment includes one or more of:
   calculating to change units to the same format,
   transforming a date format to the same format,
   combining several inputs into one output, and
   splitting one input into several outputs.

10. The method of claim 1, wherein the decoding and the converting are performed by one of a Trace Receiver Service and a Mobile Management Entity (MME) Receiver Service.

11. The method of claim 10, wherein the Trace Receiver Service operates on main Call Traces and the MME Receiver Service operates on additional Call Traces containing user identity information of users performing calls.

12. The method of claim 1, wherein the steps further include:
   performing the subsequent processing in a vendor/technology agnostic manner.

13. The method of claim 1, wherein the receiving is performed at an edge location in the mobile network.

14. A processing system comprising:
   one or more processors; and
   memory storing instructions for programming the one or more processors to
      receive a Transmission Control Protocol (TCP) data stream comprising Call Traces in vendor-proprietary formats from a mobile network having one or more vendor's equipment and one or more wireless technologies;
      decode a message from the data stream via one of a plurality of vendor- and technology-specific decoder types based on what network port the message was received on, wherein the port is used without analyzing content of the data stream and based on an operating-system determination to automatically decide which type of decoder must be used and detect how the decoding performs based on one or more of vendor's equipment and wireless technology;
      convert the message to a vendor/technology-agnostic common output format based on the decoding, wherein the common output format is a same format for the one or more vendor's equipment and the one or more wireless technologies; and
      provide the message in the common output format for subsequent processing.

15. The processing system of claim 14, wherein the instructions further program the one or more processors to:
   perform the subsequent processing in a vendor/technology agnostic manner.

16. The processing system of claim 14, wherein the data stream is received at an edge location in the mobile network.

17. The processing system of claim 14, wherein the instructions further program the one or more processors to:
   perform data enrichment to add information not present in the message.

18. A non-transitory computer-readable medium comprising instructions for programming one or more processors to perform steps of:
   receiving a Transmission Control Protocol (TCP) data stream comprising Call Traces in vendor-proprietary formats from a mobile network having one or more vendor's equipment and one or more wireless technologies;
   decoding a message from the data stream via one of a plurality of vendor- and technology-specific decoder types based on what network port the message was received on, wherein the port is used without analyzing content of the data stream and based on an operating-system determination to automatically decide which type of decoder must be used and detect how the decoding performs based on one or more of vendor's equipment and wireless technology;

converting the message to a vendor/technology-agnostic common output format based on the decoding, wherein the common output format is a same format for the one or more vendor's equipment and the one or more wireless technologies; and providing the message in the common output format for subsequent processing.

19. The non-transitory computer-readable medium of claim 18, wherein the steps further include:

performing the subsequent processing in a vendor/technology agnostic manner.

20. The non-transitory computer-readable medium of claim 18, wherein the receiving is performed at an edge location in the mobile network.

\* \* \* \* \*